United States Patent
Nakahara et al.

(10) Patent No.: US 9,599,868 B2
(45) Date of Patent: Mar. 21, 2017

(54) LIQUID CRYSTAL DISPLAY PANEL COMPRISING A CONTACT SITE FOR A PIXEL ELECTRODE THAT IS WIDER THAN A LINE PORTION OF A LEAD-OUT LINE WHEN VIEWED IN A PLAN VIEW

(71) Applicant: Sharp Kabushiki Kaisha, Osaka-shi, Osaka (JP)

(72) Inventors: Hijiri Nakahara, Osaka (JP); Mitsunori Harada, Osaka (JP); Masakatsu Tominaga, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 34 days.

(21) Appl. No.: 14/378,392

(22) PCT Filed: Feb. 15, 2013

(86) PCT No.: PCT/JP2013/053660
§ 371 (c)(1),
(2) Date: Aug. 13, 2014

(87) PCT Pub. No.: WO2013/122187
PCT Pub. Date: Aug. 22, 2013

(65) Prior Publication Data
US 2015/0036070 A1 Feb. 5, 2015

(30) Foreign Application Priority Data
Feb. 17, 2012 (JP) ................... 2012-033297

(51) Int. Cl.
*G02F 1/1368* (2006.01)
*G02F 1/1343* (2006.01)
(Continued)

(52) U.S. Cl.
CPC ...... *G02F 1/136259* (2013.01); *G02F 1/1368* (2013.01); *G02F 1/13439* (2013.01);
(Continued)

(58) Field of Classification Search
CPC ........... G02F 1/136259; G02F 1/13439; G02F 1/133345
See application file for complete search history.

(56) References Cited

U.S. PATENT DOCUMENTS

2007/0126969 A1* 6/2007 Kimura ............ G02F 1/134363
349/141
2007/0166859 A1* 7/2007 Lee .................. G02F 1/136213
438/30

(Continued)

FOREIGN PATENT DOCUMENTS

| JP | 2001-027764 A | 1/2001 |
| JP | 2010-145667 A | 7/2010 |
| JP | 2011-138118 A | 7/2011 |

OTHER PUBLICATIONS

Official Communication issued in International Patent Application No. PCT/JP2013/053660, mailed on Apr. 2, 2013.

*Primary Examiner* — Paul Lee
(74) *Attorney, Agent, or Firm* — Keating & Bennett, LLP

(57) ABSTRACT

The present invention provides a liquid crystal display panel that, when subjected to laser repair for repairing defects, can avoid degradation of members other than the target of the laser repair. A liquid crystal display panel of the present invention includes: an active matrix substrate; a counter substrate; and a liquid crystal layer interposed between the active matrix substrate and the counter substrate, the active matrix substrate including: a support substrate; a transparent electrode; a scan signal line; a data signal line; a thin film transistor connected to the scan signal line and the data signal line; a lead-out line extending from the thin film transistor; an insulating film covering the thin film transistor; and a pixel electrode connected to the lead-out line via a contact site formed through the insulating film, the transparent electrode being located at a level closer to the support (Continued)

substrate than the lead-out line and the pixel electrode are, the pixel electrode including a substantially rectangular outline when viewed in a plan view of the support substrate, the transparent electrode having a shape with a missing area that overlaps at least one corner portion of the pixel electrode, the lead-out line extending straight to overlap the corner portion of the pixel electrode, and overlapping the missing area of the transparent electrode.

4 Claims, 10 Drawing Sheets

(51) Int. Cl.
*G02F 1/1362* (2006.01)
*G02F 1/1333* (2006.01)

(52) U.S. Cl.
CPC .. *G02F 1/133345* (2013.01); *G02F 1/134309* (2013.01); *G02F 1/134363* (2013.01); *G02F 1/1362* (2013.01); *G02F 2001/134372* (2013.01)

(56) References Cited

U.S. PATENT DOCUMENTS

| | | | |
|---|---|---|---|
| 2008/0002079 A1* | 1/2008 | Kimura | G02B 6/0051 349/42 |
| 2010/0214490 A1* | 8/2010 | Tsubata | G02F 1/1368 348/725 |
| 2011/0019117 A1* | 1/2011 | Xue | G02F 1/13624 349/47 |
| 2011/0096278 A1* | 4/2011 | Kim | G02F 1/136286 349/139 |
| 2011/0134345 A1* | 6/2011 | Yamazaki | G02F 1/1368 348/790 |
| 2011/0310337 A1* | 12/2011 | Ishihara | G02F 1/134363 349/123 |
| 2012/0001838 A1* | 1/2012 | Tsubata | G02F 1/134336 345/87 |
| 2012/0001839 A1* | 1/2012 | Tsubata | G02F 1/134309 345/90 |
| 2012/0026415 A1* | 2/2012 | Tsubata | G02F 1/136213 348/790 |

* cited by examiner

LIQUID CRYSTAL DISPLAY PANEL COMPRISING A CONTACT SITE FOR A PIXEL ELECTRODE THAT IS WIDER THAN A LINE PORTION OF A LEAD-OUT LINE WHEN VIEWED IN A PLAN VIEW

TECHNICAL FIELD

The present invention relates to a liquid crystal display panel. More specifically, the present invention relates to a liquid crystal display panel that includes an active matrix substrate including electrodes at different levels on both sides of an insulating film.

BACKGROUND ART

A liquid crystal display (LCD) panel is a device that uses birefringent liquid crystal molecules, the alignment of which is controlled to allow light to pass through or to shield light (ON/OFF of the display). There are several modes of liquid crystal alignment of LCDs, including: twisted nematic (TN) mode that is characterized in that liquid crystal molecules with positive dielectric constant anisotropy are twisted 90° when viewed in the normal direction of a substrate; vertical alignment (VA) mode that is characterized in that liquid crystal molecules with negative dielectric constant anisotropy are aligned perpendicularly to the substrate surface; and in-plane switching (IPS) mode and fringe field switching (FFS) mode that are characterized in that liquid crystal molecules with either positive or negative dielectric constant anisotropy are aligned horizontally to the substrate surface, and a transverse electric field is applied to the liquid crystal layer.

A widespread system to drive a LCD panel is an active matrix driving system. This system provides high-quality images, which is attributed to active elements, including a thin film transistor (TFT), disposed in each pixel. As examples of substrates for LCD panels provided with TFTs, mention may be made of an active matrix substrate in which a plurality of scan signal lines and a plurality of data signal lines cross each other, and at each of the intersections of these lines, a TFT and a pixel electrode are provided. A common type of LCD panel is provided with a common electrode in the active matrix substrate or the counter substrate such that a voltage is applied to the liquid crystal layer thorough this pair of electrodes.

In such an active matrix substrate, display defects may occur when a short circuit occurs between lines of different kinds. One possible solution for such a trouble is laser repair treatment that involves laser radiation for cutting, for example, at least one of a drain line and a source line of a target TFT, thereby preventing transmission of a scan signal and an image signal to a pixel electrode (for example, Patent Literature 1).

FIG. 11 is a plan view schematically showing one example of a conventional laser repair treatment. In the example shown in FIG. 11, a pixel electrode PX and a counter electrode CT are provided for each of regions defined by gate lines GL and drain lines DL, and each drain line DL is electrically connected to the corresponding pixel electrode PX through a TFT and a source line SL. The TFT is composed of parts of the gate line GL, the drain line DL and the source line SL. More specifically, the drain line DL includes a trifurcated end, and the source line SL extends into the spaces between the three branches of the drain line DL. The two branches of the source line SL in the spaces are integrated into one, and the integrated source line SL extends to overlap the pixel electrode PX, and is electrically connected to the pixel electrode PX via a contact hole H.

Patent Literature 1 teaches that when there is an unwanted object that overlaps a TFT, the source line SL is a target of laser repair. The laser radiation targeted to the source line SL cuts the source line SL so that the pixel electrode PX and the drain line DL connected to the TFT with the unwanted object are electrically separated from each other. Another strategy is laser radiation to the contact hole H. This makes a short circuit between the pixel electrode PX and the counter electrode CT, so that the pixel electrode PX and the counter electrode CT have the same potential. Consequently, the pixel becomes a black spot.

CITATION LIST

Patent Literature

Patent Literature 1: JP 2010-145667 A

SUMMARY OF INVENTION

Technical Problem

The present inventors have studied such laser repair techniques in detail, and found that laser radiation for cutting a source line SL has the following disadvantage when a defect is found in an inspection step after bonding the active matrix substrate and the counter substrate and injecting liquid crystal between the substrates, or after dropping liquid crystal onto either the active matrix substrate or the counter substrate, and bonding the substrates: if the counter electrode CT is located below the pixel electrode PX as described above, laser beams may be allowed to pass through the counter electrode CT, and therefore may damage the counter electrode CT, causing alignment defects while a voltage is applied.

FIG. 12 is an electron microscopic photograph of a liquid crystal display panel having been subjected to laser repair by a conventional layer repair technique. As seen in FIG. 12, the laser cut area is gleaming white, which indicates that the alignment of liquid crystal in this area is disturbed. One possible solution for this is to cover the laser cut area with a black matrix. Since the alignment of liquid crystal is disturbed over not only the laser cut area but also a wide area around the laser cut area, a large black matrix is necessary. Unfortunately, this may lead to a reduced aperture ratio.

The present invention has been made in view of the above-mentioned background, and an object of the invention is to provide a liquid crystal display panel that, when subjected to laser repair for repairing defects, can avoid degradation of members other than the target of the laser repair.

Solution to Problem

The present inventors have found that in the case of laser repair to an assembled liquid crystal display panel, laser beams should be emitted from a side of a support substrate, which is abase of an active matrix substrate, and that in the case where a transparent electrode is located below both a pixel electrode and a lead-out line that supplies a data signal from a TFT to the pixel electrode, laser repair should be performed in such a manner to allow laser beams to pass through the transparent electrode. Additionally, the present inventors have focused on the fact that a site that can be suitably cut with laser beams is a lead-out line that extends from a TFT to overlap an pixel electrode, and is electrically connected to the pixel electrode, and found that the following structure ensures a larger area for cutting without significant alteration of the original structure of the transparent electrode: the transparent electrode is designed to have a shape with a missing area that overlaps a corner portion of the pixel electrode so as to allow the lead-out line to pass through the missing area. Thus, the present inventors found a way to solve the above problem, and completed the present invention.

Specifically, one aspect of the present invention is a liquid crystal display panel including: an active matrix substrate; a counter substrate; and a liquid crystal layer interposed between the active matrix substrate and the counter substrate, the active matrix substrate including: a support substrate; a transparent electrode; a scan signal line; a data signal line; a thin film transistor connected to the scan signal line and the data signal line; a lead-out line extending from the thin film transistor; an insulating film covering the thin film transistor; and a pixel electrode connected to the lead-out line via a contact site formed through the insulating film, the transparent electrode being located at a level closer to the support substrate than the lead-out line and the pixel electrode are, the pixel electrode including a substantially rectangular outline when viewed in a plan view of the support substrate, the transparent electrode having a shape with a missing area that overlaps at least one corner portion of the pixel electrode, the lead-out line extending straight to overlap the corner portion of the pixel electrode, and overlapping the missing area of the transparent electrode.

The thin film transistor (TFT) is configured to receive a data signal transmitted via the data signal line. The thin film transistor has a switching function of controlling, based on a scan signal supplied from the scan signal line, the supply of a data signal therefrom.

In the active matrix substrate, the transparent electrode is located at a level closer to the support substrate than the lead-out line and the pixel electrode are. An object of the present invention is to prevent degradation of the transparent electrode during laser repair, and accordingly, the function and role of the transparent electrode are not particularly limited as long as it has desired transparency and conductivity. Specifically, members referred to as a so-called "line" are also included within the scope of the transparent electrode.

The pixel electrode includes a substantially rectangular outline when viewed in a plan view of the support substrate. The term "substantially rectangular" as used herein refers to a shape essentially consisting of shorter sides and longer sides which intersect at a right angle, and the outline may be partially projecting or recessed.

The transparent electrode has a shape with a missing area that overlaps at least one corner portion of the pixel electrode, and the lead-out line at least partially overlaps the missing area of the transparent electrode. If laser repair is targeted to the lead-out line which overlaps the missing area of the transparent electrode, the transparent electrode can avoid damage. The expression "a corner portion of the pixel electrode" means areas at the four corners of the substantially rectangular pixel electrode. More specifically, the term refers to an area extending from a corner of the substantially rectangular pixel electrode over less than half the length of the shorter sides of the pixel electrode.

The structure of the liquid crystal display panel is not particularly limited by other members as long as it includes these essential members.

The following describes preferable embodiments of the liquid crystal display panel. A combination of two or more of the preferable embodiments of the liquid crystal display panel described below should also be considered as another preferable embodiment of the liquid crystal display panel.

Preferably, the outline of the transparent electrode substantially coincides with the outline of the pixel electrode except the missing area. This design of the outline of the transparent electrode prevents parasitic capacitance, which may occur outside the area in which the transparent electrode overlaps the pixel electrode.

It is preferable that the pixel electrode and the transparent electrode are laminated with the insulating film interposed therebetween, and that the pixel electrode is provided with a linear slit in the inside thereof. This structure allows for an "FFS-mode" liquid crystal display panel which generates a transverse electric field in the liquid crystal layer between the transparent electrode and the pixel electrode. FFS mode causes less disturbance of the liquid crystal alignment and improves the transmittance because it ensures a larger pixel aperture ratio and generates less parasitic capacitance between the pixel electrode and other lines. Additionally, this mode can be driven with less energy, and therefore contributes to low power consumption.

It is preferable that the pixel electrode and the transparent electrode are laminated with the insulating film interposed therebetween, and that the counter substrate includes a common electrode that overlaps the pixel electrode. This structure allows for various modes modified from "TN mode" or "VA mode" which generate a vertical electric field in the liquid crystal layer between the pixel electrode of the active matrix substrate and the common electrode of the counter substrate, and allows the transparent electrode to function as a storage capacitor electrode for increasing the pixel capacitance.

Advantageous Effects of Invention

The liquid crystal display panel of the present invention, when subjected to laser repair for repairing defects, can avoid degradation of members other than the target of the laser repair.

DESCRIPTION OF EMBODIMENTS

The following embodiments are offered to illustrate the present invention in more detail with reference to the figures, and are not intended to limit the present invention.

The term "pixel" as used herein refers to a region enclosed by two adjacent scan signal lines and two adjacent data signal lines.

The following embodiments 1 to 3 can be specifically applied to liquid crystal display devices for televisions, personal computers, mobile phones, car navigation systems, information displays, and the like.

Embodiment 1

Figure 1:
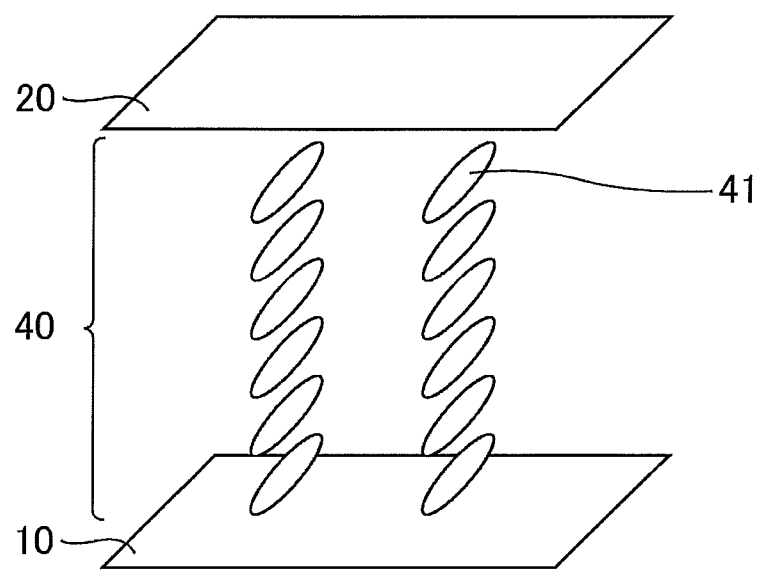
FIG. 1 is a perspective view schematically illustrating the alignment of liquid crystal in a liquid crystal display panel of Embodiment 1.

Embodiment 1 shows one example of FFS mode liquid crystal display panels. FIG. 1 is a perspective view schematically illustrating the alignment of liquid crystal in a liquid crystal display panel of Embodiment 1. The liquid crystal display panel of Embodiment 1 includes an active matrix substrate 10, a counter substrate 20, and a liquid crystal layer 40 interposed between the active matrix substrate 10 and the counter substrate 20. The liquid crystal layer 40 includes liquid crystal molecules 41, and the molecules are aligned horizontally to the surfaces of the substrates 10 and 20. The active matrix substrate includes a support substrate, TFTs, scan signal lines, data signal lines, common electrodes (transparent electrodes), pixel electrodes, an insulating film electrically separating the lines and the electrodes, and an alignment film. The counter substrate 20 includes a support substrate, color filters, a black matrix, and an alignment film. Alternatively, the color filters and the black matrix may be formed in the active matrix 10 instead of the counter substrate 20.

Figure 2:
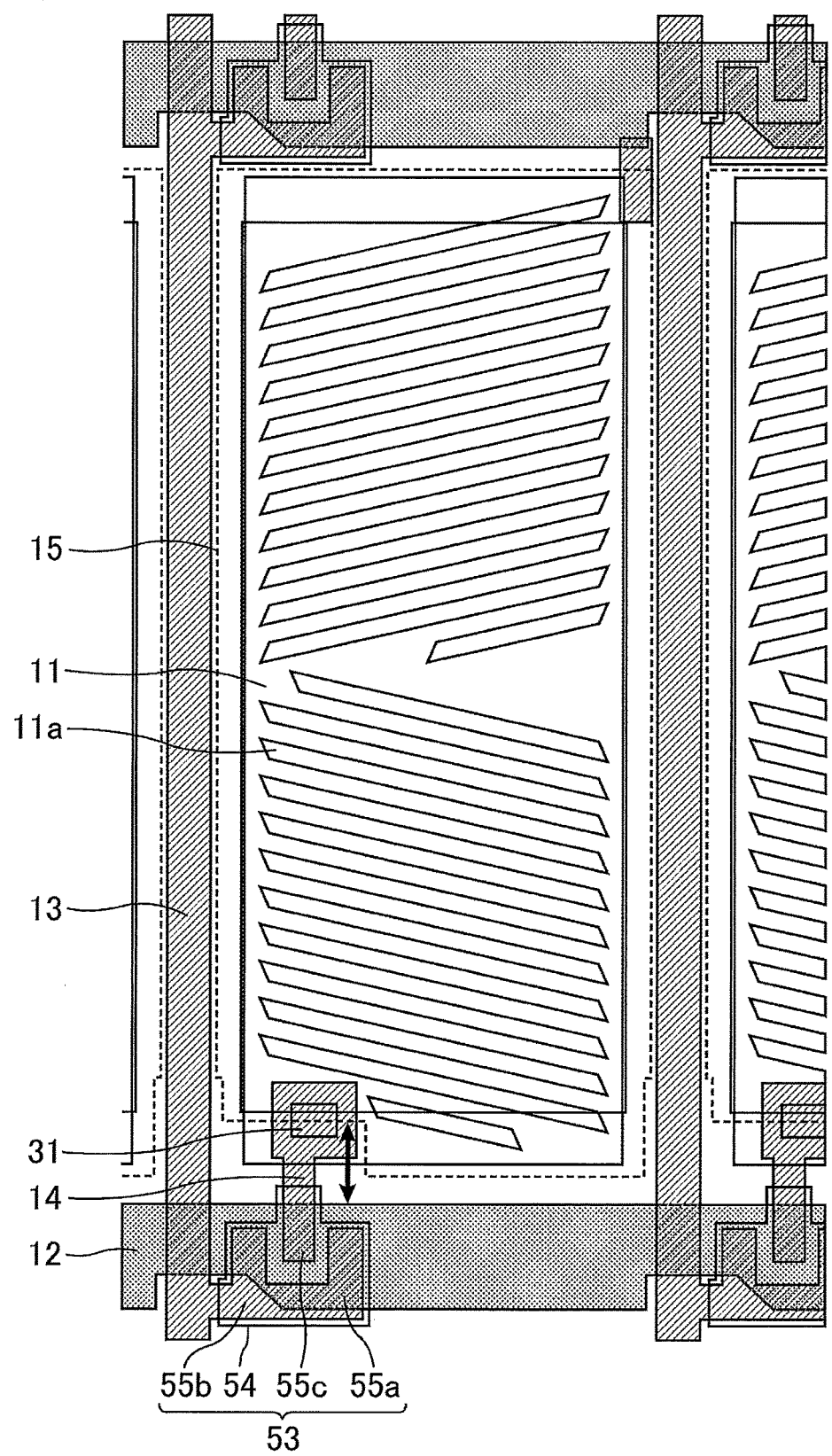
FIG. 2 is a plan view schematically illustrating an active matrix substrate in Embodiment 1.
Figure 3:
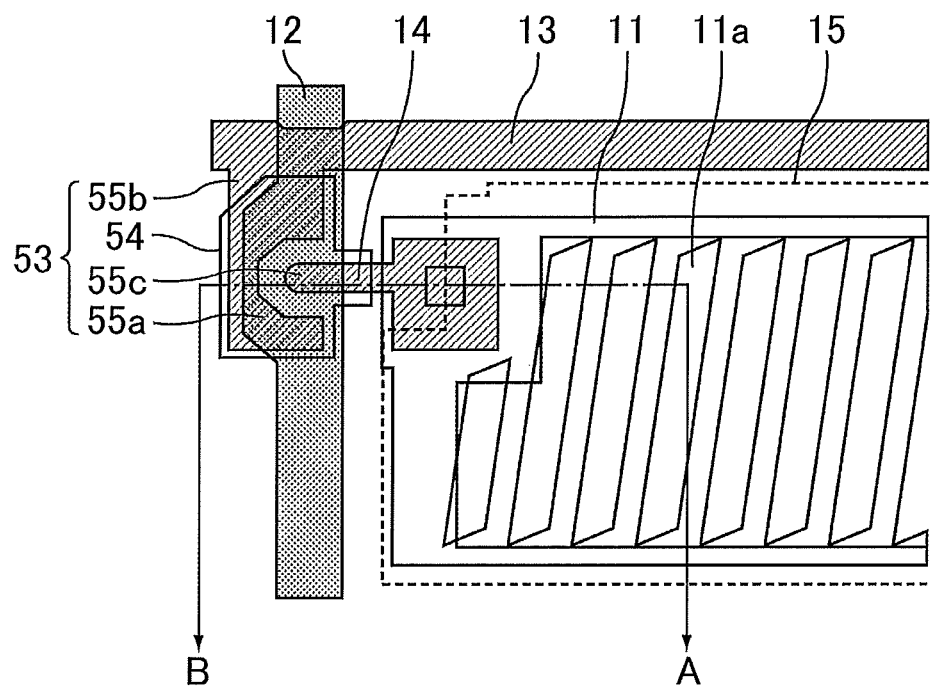
FIG. 3 is an enlarged plan view schematically illustrating a TFT and an area thereabout of the active matrix substrate in Embodiment 1.
Figure 4:
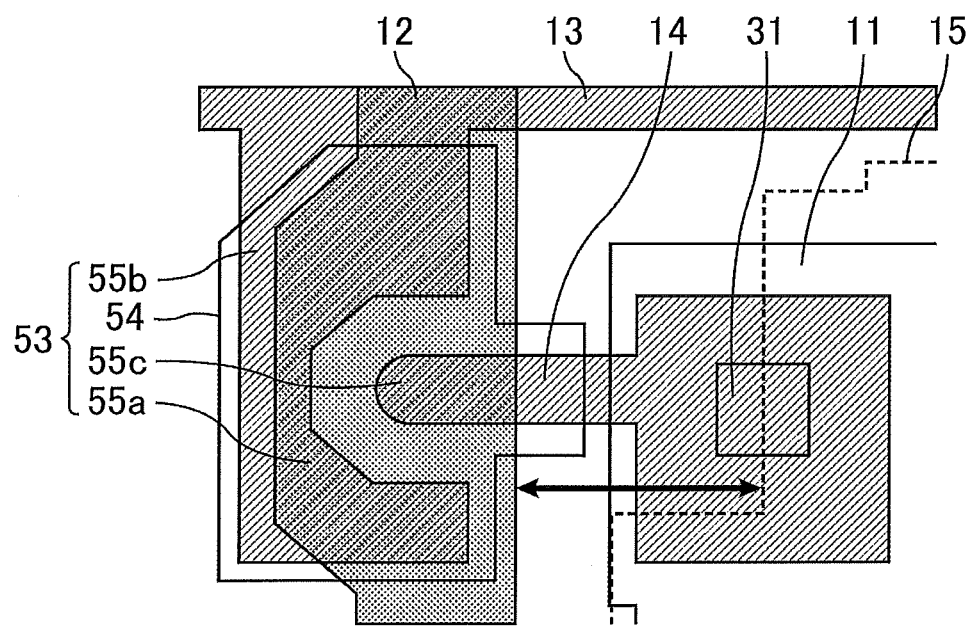
FIG. 4 is a more enlarged schematic plan view of FIG. 3.

FIG. 2 is a plan view schematically illustrating the active matrix substrate in Embodiment 1. FIG. 3 is an enlarged plan view schematically illustrating a TFT and an area therearound of the active matrix substrate in Embodiment 1. FIG. 4 is a more enlarged schematic plan view of FIG. 3. As shown in FIG. 2, the scan signal lines 12 and the data signal lines 13 cross each other and enclose the pixel electrodes 11 when viewed in a plan view of the active matrix substrate in Embodiment 1. The TFTs (thin film transistors) 53 are formed near the respective intersections of the scan signal lines 12 and the data signal lines 13.

The TFT 53 is a switching element including a semiconductor layer 54, a gate electrode 55a, a source electrode 55b and a drain electrode 55c. The gate electrode 55a of the TFT 53 is constituted by a part of the scan signal line 12. The source electrode 55b of the TFT 53 is a branch extending from the source line, and bends to surround the end of the drain electrode 55c. A lead-out line (drain lead-out line) 14 extends from one of the ends of the drain electrode 55c of the TFT 53. The drain lead-out line 14 extends straight to overlap a corner portion of the pixel electrode 11, includes a wide part that overlaps the corner portion of the pixel electrode 11, and is connected to the pixel electrode 11 via a contact site 31 formed through the insulating film. The gate electrode 55a and the semiconductor layer 54 are laminated with a gate insulating film interposed therebetween. The source electrode 55b is connected to the drain electrode 55c via the semiconductor layer 54. The intensity of current flowing through the semiconductor layer 54 is controlled based on a scan signal received by the gate electrode via the scan signal line 12 to control the transmittance of a data signal, which is received via the data signal line 13 by the source electrode 55b, the semiconductor layer 54, the drain electrode 55c, the drain lead-out line 14, and the pixel electrode 11 in the stated order.

The pixel electrode 11 is a comb-shaped electrode with a substantially rectangular outline. A plurality of pixel electrodes are disposed in the respective areas enclosed by the scan signal lines 12 and the data signal lines 13. The pixel electrode 11 is provided with a plurality of slits 11a. The slits 11a of the pixel electrode 11 create an arc-shaped electric field in the liquid crystal layer between the pixel electrode 11 and the common electrode 15. Each slit 11a extends in a direction tilted by several degrees from the direction parallel to the length direction of the scan signal line 12. There is no slit 11a in an area near the contact site 31 connecting the drain lead-out line 14 and the pixel electrode 11. The slits 11a of the pixel electrode 11 are symmetrical with respect to the bisector equally dividing the longer sides of the pixel electrode 11. This symmetrical structure contributes to better balance of the alignment of liquid crystal.

The common electrode 15 receives a common signal of a constant level. The common electrodes 15 are likewise disposed in the respective pixels enclosed by the scan signal lines 12 and the data signal lines 13. The common electrode 15 has a shape with a missing area that overlaps the corner portion of the pixel electrode 11 closest to the TFT 53. The outline of the common electrode 15 substantially coincides with the outline of the pixel electrode 11 except the missing area. The drain lead-out line 14 extends to at least partially overlap the missing area of the common electrode 15. This structure ensures a larger area for laser repair without significant alteration of the outline shape of the common electrode 15. As is understood from FIG. 2, for example, in Embodiment 1, no matter which part of the drain lead-out line 14 (the thin line shaped portion) is subjected to laser repair, the common electrode 15 will not be damaged. This structure thus prevents alignment defect of liquid crystal while a voltage is applied.

In Embodiment 1, the distance between the scan signal line 12 and the common electrode 15 (the length of the thick arrow shown in FIGS. 2 and 4) is 5 to 20 μm. The distance between the shorter side of the pixel electrode 11 and the missing area of the common electrode 15 (the side parallel to the shorter side of the pixel electrode 11) is 5 μm or more. The distance between the longer side of the pixel electrode 11 and the missing area of the common electrode 15 (the side parallel to the longer side of the pixel electrode 11) is 5 μm or more.

Figure 5:
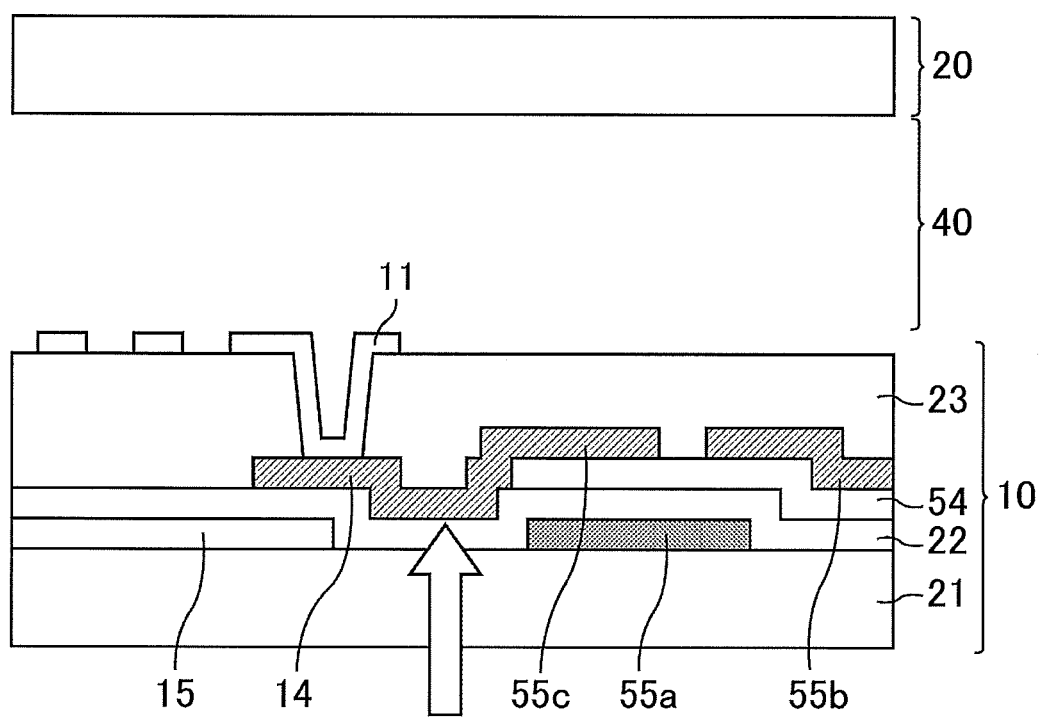
FIG. 5 is a cross-sectional view schematically illustrating the TFT and an area thereabout of the liquid crystal display panel of Embodiment 1.

FIG. 5 is a cross-sectional view schematically illustrating the TFT and an area therearound of the liquid crystal display panel of Embodiment 1. Specifically, FIG. 5 is a view showing the cross section along the A-B line in FIG. 3. The active matrix substrate 10 is a laminate including a transparent support substrate 21, the common electrode (transparent electrode) 15, the gate electrode 55a, a gate insulating film (GI) 22, the semiconductor layer 54, the source/drain electrodes 55b, 55c, a passivation film (PAS) 23, and pixel electrodes 11 in the stated order towards the liquid crystal layer 40. The active matrix substrate 10 faces the counter substrate 20 with the liquid crystal layer 40 interposed therebetween. Due to the potential difference between the common electrodes 15 and the pixel electrodes 11, a transverse electric field (an arc-shaped electric field when viewed in a cross section) is generated in the liquid crystal layer 40 to change the orientation of liquid crystal molecules. This mechanism can be used to change the birefringence of light passing through the liquid crystal layer 40.

In Embodiment 1, laser repair is performed such that laser beams are emitted from the support substrate 11 side to the drain lead-out line 14, as shown by the outline arrow in FIG. 5, for example. When the drain lead-out line 14 is irradiated with laser beams, the drain lead-out line 14 melts to be cut. This turns the pixel into a black spot.

The following describes materials and a production method for the members.

For the support substrate 21, transparent materials, such as glass and plastic, are suitably used. For the gate insulating film 22 and the passivation film 23, transparent materials, such as silicon nitride, silicon oxide, and photosensitive acrylic resin, are suitably used. The gate insulating film 22 and the passivation film 23 are formed, for example, by forming a silicon nitride film by plasma enhanced chemical vapor deposition (PECVD), and forming a photosensitive acrylic resin film on the silicon nitride film by die-coating (application). A hole to be a contact site can be formed by dry etching (channel etching) in the passivation film 23.

Various electrodes for the scan signal line 12, the data signal line 13, the drain lead-out line 14, and the TFT 53 can be formed by forming a single-layer or a multi-layer film of a metal, such as titanium, chrome, aluminum, or molybdenum, or an alloy thereof, by sputtering, and patterning it by photolithography. Among these lines and electrodes, those to be formed at the same level may be produced using the same material, thereby increasing the production efficiency.

The semiconductor layer 54 of the TFT 53 is composed of, for example, a high-resistant semiconductor layer (i layer) made of amorphous silicon or polysilicon, and a low-resistant semiconductor layer (n+ layer) made of $n^+$ amorphous silicon, such as amorphous silicon doped with an impurity (e.g. phosphorus). The semiconductor layer 54 may be a layer of an oxide semiconductor such as zinc oxide. The shape of the semiconductor layer 54 can be finished by, after forming a film by PECVD or the like, patterning the film by photolithography or the like.

The pixel electrode 11 and the common electrode 15 can be formed by, for example, after forming a single-layer or a multi-layer film made of a transparent conductive material, such as indium tin oxide (ITO), indium zinc oxide (IZO), zinc oxide (ZnO), or tin oxide (SnO), or an alloy thereof, by sputtering or the like, patterning the film by photolithography or the like. The slits of the pixel electrode and the missing area of the common electrode can be formed at the same time as the patterning.

For the color filters, photosensitive resins (color resists) that allow light of a desired color to pass therethrough are suitably used. For the black matrix, any material can be used without limitation as long as it shields light. Preferred examples include resin materials containing a black pigment and metal materials that shield light.

Figure 6:
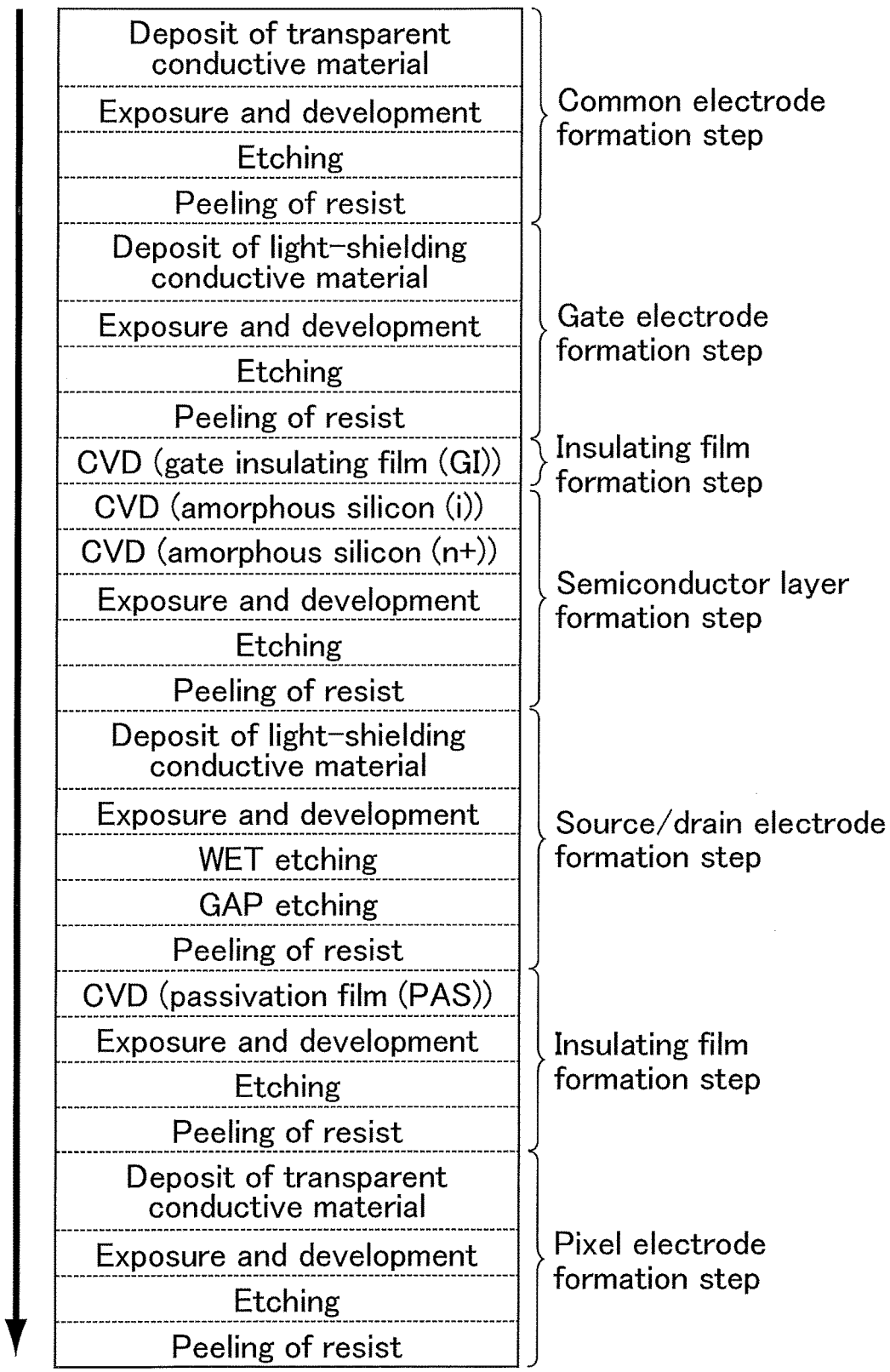
FIG. 6 is a flowchart showing one exemplary series of steps for the production of a TFT and electrodes of different types.

In FIG. 6, one exemplary series of steps for the production of the TFT and electrodes of different types of Embodiment 1 are summarized. The structure of Embodiment 1 can be formed by, for example, laminating layers of a common electrode, a gate electrode, a gate insulating film (GI), a semiconductor layer (n+ layer/i layer), source/drain electrodes, a passivation film (PAS), and a pixel electrode in the stated order.

The active matrix substrate 10 and the counter substrate 20 thus formed are bonded to each other with a sealing material after forming a plurality of columnar spacers made of an insulating material on either of the substrate. In the case where the liquid crystal layer 40 between the active matrix substrate 10 and the counter substrate 20 is formed by dropping, a liquid crystal material is dropped before bonding the substrates, and in the case of vacuum injection, the liquid crystal material is injected after bonding the substrates. To the surface of each substrate opposite to the liquid crystal layer 40 side, a polarizing plate, a retarder film, and the like are attached. Thus, a liquid crystal display panel is assembled. A gate driver, a source driver, a display control circuit and the like are further installed on the liquid crystal display panel together with a back light unit or the like to obtain a liquid crystal display device for a desired purpose.

The structure of the liquid crystal display panel of Embodiment 1 can be confirmed and measured with, for example, an optical microscope (semiconductor/FPD inspection microscope MX61L manufactured by Olympus Corporation) and a scanning transmission electron microscope energy dispersive X-ray spectroscope (STEM-EDX) (HD-2700 manufactured by Hitachi High-Technologies Corporation).

An example of lasers suitably used to repair the liquid crystal display panel of Embodiment 1 is a Nd: YAG Laser (neodymium yttrium aluminum garnet laser, HSL4000II manufactured by HOYA).

Embodiment 2

Figure 7:
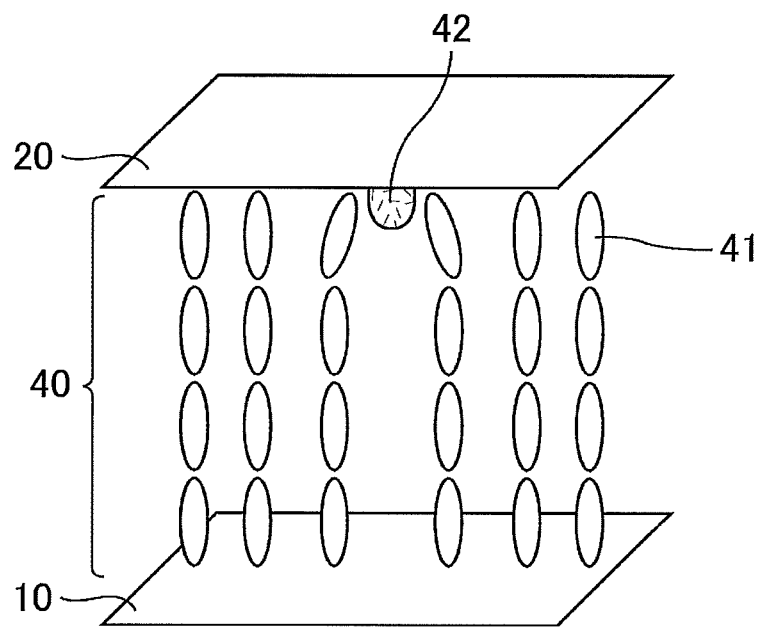
FIG. 7 is a perspective view schematically illustrating the alignment of liquid crystal in a liquid crystal display panel of Embodiment 2.

Embodiment 2 shows one example of liquid crystal display panels of continuous pinwheel alignment (CPA) mode, which is a kind of VA mode. FIG. 7 is a perspective view schematically illustrating the alignment of liquid crystal in the liquid crystal display panel of Embodiment 2. The liquid crystal display panel of Embodiment 2 includes an active matrix substrate 10, a counter substrate 20, and a liquid crystal layer 40 interposed between the active matrix substrate 10 and the counter substrate 20. The liquid crystal display panel of Embodiment 2 is provided with columnar projections 42 on the counter substrate 20 (in a spotted pattern when viewed in a plan view). More specifically, the projections 42 are made of an insulating material, and are formed on the surface of the common electrodes on the liquid crystal layer 40 side. Hereinafter, these projections 42 are also referred to as rivets. Alternatively, for example, holes may be formed in the common electrodes instead of the projections 42. As shown in FIG. 7, while no voltage is applied, most liquid crystal molecules 41 are aligned perpendicularly to the substrate surfaces except a part of the liquid crystal molecules 41 near the rivets 42 or the holes. Once a voltage is applied to the liquid crystal layer 40 in this state, the molecules are tilted towards the rivets 42 or the holes in a radial pattern. This ensures good viewing angle characteristics. Suitable insulating materials for the rivets 42 are transparent resins, such as phenol novolac photosensitive resins.

Figure 8:
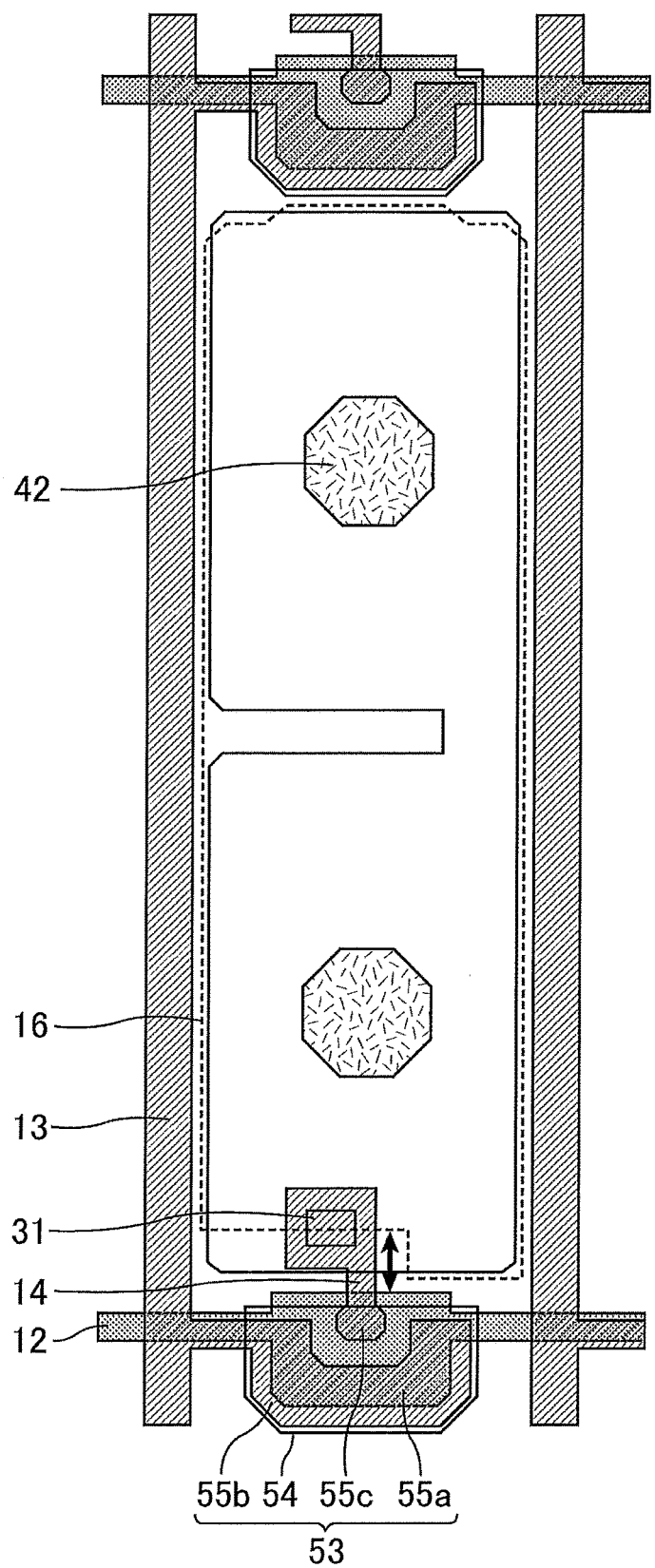
FIG. 8 is a plan view schematically illustrating an active matrix substrate in Embodiment 2.

FIG. 8 is a plan view schematically illustrating the active matrix substrate in Embodiment 2. The active matrix substrate in Embodiment 2 includes TFTs 53, scan signal lines 12, data signal lines 13, storage capacitor electrodes (transparent electrodes) 16, pixel electrodes 11, an insulating film electrically separating the lines and the electrodes, and an alignment film. This structure can avoid a reduction of the aperture ratio in spite of the storage capacitor members, and therefore ensures a high aperture ratio. The storage capacitor electrodes 16 are disposed at a level closer to the support substrate than the data signal line 13 and the pixel electrode 11 are. The counter substrate includes color filters, a black matrix, common electrodes, dielectric projections, and an alignment film. The color filters and the black matrix may be formed in the active matrix substrate instead of the counter substrate.

A plurality of pixel electrodes 11 are disposed in the respective areas enclosed by the scan signal lines 12 and the data signal lines 13. The pixel electrode 11 includes a substantially rectangular outline. The pixel electrode 11 is provided with a center slit 11a, and separated into upper and lower parts connected through a bridge (bridging part). In the case of a mode of controlling the alignment in a radial pattern around a rivet, these two separated upper and lower parts of the pixel electrode 11, which are substantially square, contribute to better balance among a plurality of regions with different liquid crystal alignment patterns (in a domain). The center slit 11a runs parallel to the length direction of the scan signal line 12 and overlaps the bisector of the longer sides of the pixel electrode. This symmetrical structure contributes to better balance of the alignment of liquid crystal.

The storage capacitor electrodes 16 are likewise disposed in the respective areas enclosed by the data signal lines 13 and the scan signal lines 12. The storage capacitor electrode 16 includes a substantially rectangular outline. Unlike the pixel electrode, no center slit is formed in the storage capacitor electrode 16, and the storage capacitor electrode 16 has a shape with a missing area at a corner portion. The outline of the storage capacitor electrode 16 substantially coincides with the outline of the pixel electrode 11 except the missing area. Examples of materials for the storage capacitor electrode 16 include transparent conductive materials, such as indium tin oxide (ITO), indium zinc oxide (IZO), zinc oxide (ZnO), and tin oxide (SnO). The use of a transparent conductive material for the storage capacitor electrode 16 can avoid a reduction of the aperture ratio in spite of the storage capacitor member, and therefore ensures a high aperture ratio.

In Embodiment 2, the TFT 53 is positioned halfway between two data signal lines 13, and is not positioned near the intersection of the scan signal line 12 and the data signal line 13. A gate electrode 55a of the TFT 53 is constituted by a part of the scan signal line 12. A source electrode 55b of the TFT 53 is a branch extending from a part of the source line, and bends to surround the end of a drain electrode 55c. A drain lead-out line 14 extends straight to overlap a corner portion of the pixel electrode 11, includes a wide part that overlaps the corner portion of the pixel electrode 11, and is connected to the pixel electrode 11 via a contact site 31 formed through the insulating film.

In Embodiment 2, the storage capacitor electrode 16 has a shape with a missing area that overlaps one of the corner portions of the pixel electrode 11 closest to the TFT 53. The drain lead-out line 14 extends to at least partially overlap the missing area of the storage capacitor electrode 16. This structure ensures a larger area for laser repair without significant alteration of the outline shape of the storage capacitor electrodes 16. In Embodiment 2, the distance between the scan signal line 12 and the common electrode 15 (the length of the thick arrow shown in FIG. 8) is 5 to 20 µm. The distance between the shorter side of the pixel electrode 11 and the missing area of the common electrode 15 (the side parallel to the shorter side of the pixel electrode 11) is 5 µm or more. The distance between the longer side of the pixel electrode 11 and the missing area of the common electrode 15 (the side parallel to the longer side of the pixel electrode 11) is 5 µm or more.

Embodiment 3

Figure 9:
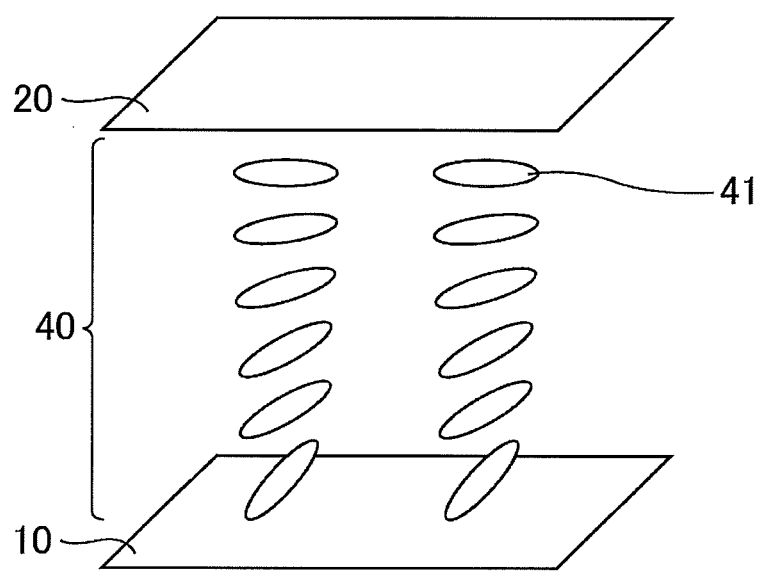
FIG. 9 is a perspective view schematically illustrating the alignment of liquid crystal in a liquid crystal display panel of Embodiment 3.

Embodiment 3 shows one example of TN mode liquid crystal display panels. FIG. 9 is a perspective view schematically illustrating the alignment of liquid crystal in the liquid crystal display panel of Embodiment 3. The liquid crystal display panel of Embodiment 3 includes an active matrix substrate 10, a counter substrate 20, and a liquid crystal layer 40 interposed between the active matrix substrate 10 and the counter substrate 20. The surfaces of the active matrix substrate 10 and the counter substrate 20 are alignment treated. The directions of alignment treatment of these substrates are perpendicular to each other. This allows liquid crystal molecules 41 near either substrate to be aligned horizontally to the substrate surface and liquid crystal molecules 41 further from the substrate and closer to the other substrate to be more tilted up to 90° with respect to an in-plane direction while no voltage is applied, as shown in FIG. 9. Once a voltage is applied, the liquid crystal molecules 41 are tilted in the same direction to change the birefringence of light passing through the liquid crystal layer.

Figure 10:
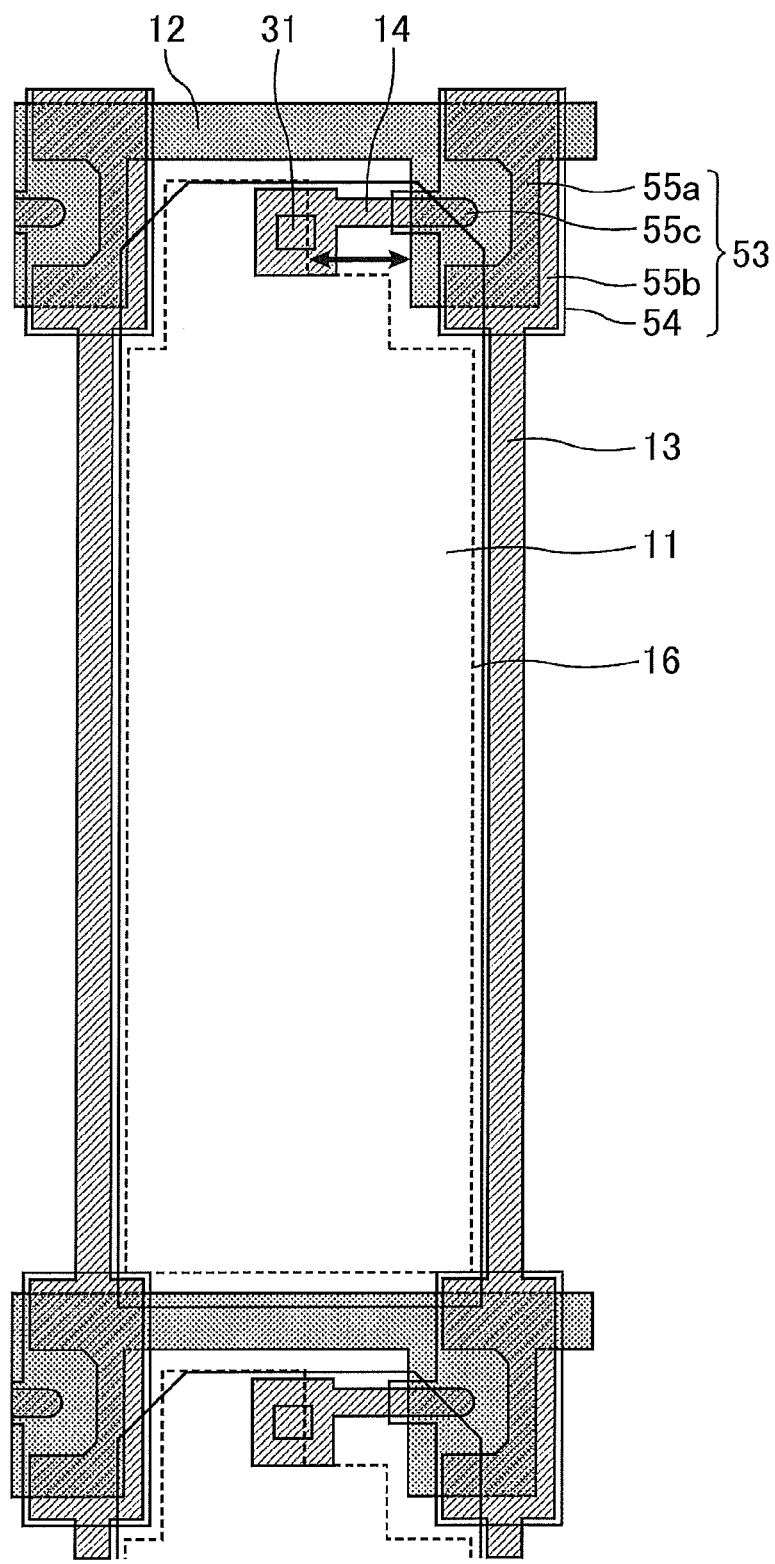
FIG. 10 is a plan view schematically illustrating an active matrix substrate in Embodiment 3.
Figure 11:
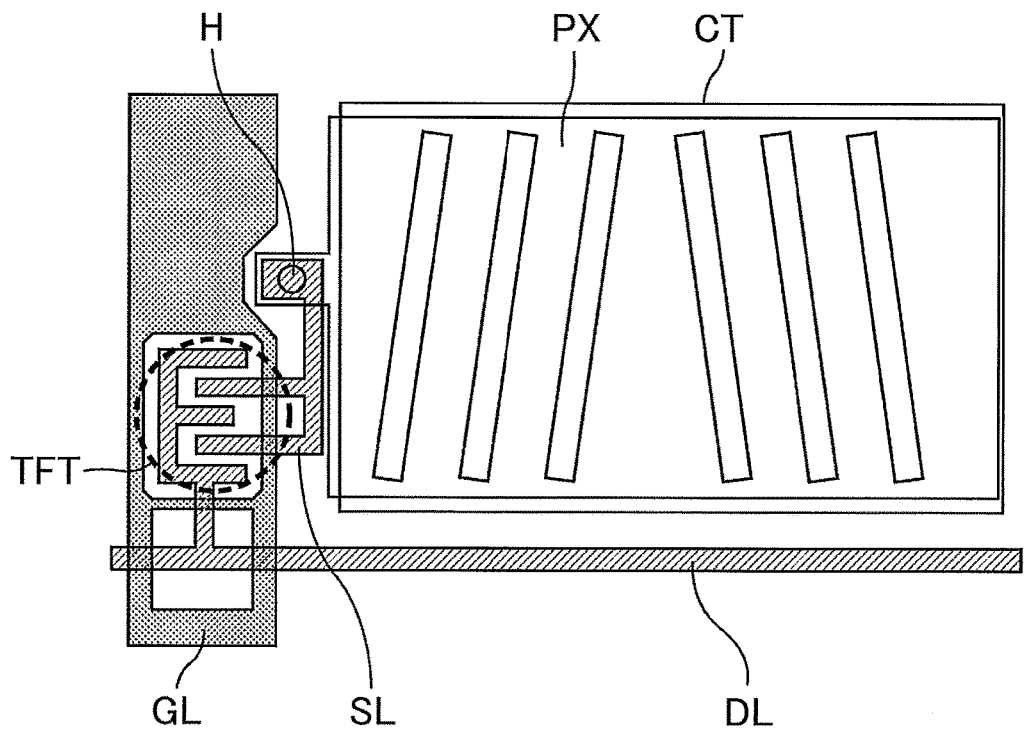
FIG. 11 is a plan view schematically showing one example of a conventional laser repair treatment.
Figure 12:
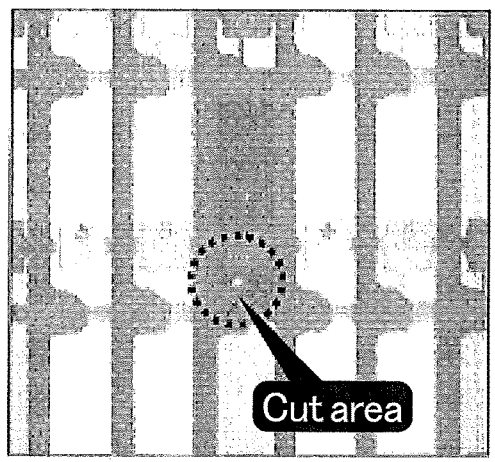
FIG. 12 is an electron microscopic photograph of a liquid crystal display panel having been subjected to laser repair by a conventional layer repair technique.

FIG. 10 is a plan view schematically illustrating the active matrix substrate in Embodiment 3. The active matrix substrate in Embodiment 3 includes TFTs 53, scan signal lines 12, data signal lines 13, storage capacitor electrodes (transparent electrodes) 16, pixel electrodes 11, an insulating film electrically separating the lines and the electrodes, and an alignment film. This structure can avoid a reduction of the aperture ratio in spite of the storage capacitor members, and therefore ensures a high aperture ratio. The storage capacitor electrodes 16 are disposed at a level closer to the support substrate than the data signal lines 12 and the pixel electrode 11 are. The counter substrate includes color filters, a black matrix, a common electrode, and an alignment film. The color filters and the black matrix may be formed in the active matrix substrate instead of the counter substrate.

The pixel electrodes 11 are disposed in the respective areas enclosed by the scan signal lines 12 and the data signal lines 13. The pixel electrode 11 includes a substantially rectangular outline. The storage capacitor electrodes 16 are likewise disposed in the respective areas enclosed by the data signal lines 13 and the scan signal lines 12. The storage capacitor electrode 16 includes a substantially rectangular outline. The storage capacitor electrode 16 has a shape with a missing area at a corner portion. The outline of the storage capacitor electrode 16 substantially coincides with the outline of the pixel electrode 11 except the missing area. In Embodiment 3, there is no slit in the pixel electrode 11.

In Embodiment 3, the TFT 53 is formed at each intersection of the scan signal line 12 and the data signal line 13. A gate electrode 55a of the TFT 53 is a branch extending from a part of the scan signal line 12. A source electrode 55b of the TFT 53 is constituted by a part of the source line, and bends to surround the end of a drain electrode 55c. A drain lead-out line 14 extends straight to overlap a corner portion of the pixel electrode 11, includes a wide part that overlaps the corner portion of the pixel electrode 11, and is connected to the pixel electrode 11 via a contact site 31 formed through the insulating film.

In Embodiment 3, the common electrode 15 has a shape with a missing area that overlaps the corner portion of the pixel electrode 11 closest to the TFT 53. The drain lead-out line 14 extends to at least partially overlap the missing area of the storage capacitor electrode 16. This structure ensures a larger area for laser repair without significant alteration of the outline shape of the storage capacitor electrodes 16. In Embodiment 3, the distance between the scan signal line 12 and the common electrode 15 (the length of the thick arrow shown in FIG. 10) is 5 to 20 µm. The distance between the shorter side of the pixel electrode 11 and the missing area of the common electrode 15 (the side parallel to the shorter side of the pixel electrode 11) is 5 µm or more. The distance between the longer side of the pixel electrode 11 and the missing area of the common electrode 15 (the side parallel to the longer side of the pixel electrode 11) is 5 µm or more.

Thus, the liquid crystal display panels of Embodiments 1 to 3 are described. Two or more of the structural features described in the embodiments, including the structure of TFTs, can be appropriately employed together.

REFERENCE SIGNS LIST

10: Active matrix substrate
11: Pixel electrode
11a: Slit
12: Scan signal line
13: Data signal line
14: Drain lead-out line
15: Common electrode (transparent electrode)
16: Storage capacitor electrode (transparent electrode)
20: Counter substrate
21: Support substrate
22: Gate insulating film (GI)
23: Passivation film (PAS)
31: Contact site
40: Liquid crystal layer
41: Liquid crystal molecule
42: Rivet (projection)
53: TFT (thin film transistor)
54: Semiconductor layer
55a: Gate electrode
55b: Source electrode
55c: Drain electrode
GL: Gate line
DL: Drain line
SL: Source line
PX: Pixel electrode
CT: Counter electrode
H: Contact hole

The invention claimed is:

1. A liquid crystal display panel comprising:
an active matrix substrate;
a counter substrate; and
a liquid crystal layer between the active matrix substrate and the counter substrate,
the active matrix substrate includes:
    a support substrate;
    a transparent electrode;
    a scan signal line;
    a data signal line;
    a thin film transistor connected to the scan signal line and the data signal line;
    a lead-out line extending from the thin film transistor;
    an insulating film covering the thin film transistor; and
    a pixel electrode connected to the lead-out line via a contact site extending through the insulating film, wherein
the transparent electrode is at a level closer to the support substrate than the lead-out line and the pixel electrode,
the pixel electrode includes a substantially rectangular outline when viewed in a plan view of the support substrate,
the transparent electrode has a shape with a missing area that overlaps at least one corner portion of the pixel electrode,
the lead-out line extends straight to overlap the at least one corner portion of the pixel electrode, the lead-out line includes a line portion that does not overlap the pixel electrode, and overlaps the missing area of the transparent electrode, and
the contact site is wider than the line portion when viewed in the plan view of the support substrate.

2. The liquid crystal display panel according to claim 1, wherein an outline of the transparent electrode substantially coincides with an outline of the pixel electrode except the missing area.

3. The liquid crystal display panel according to claim 1, wherein the pixel electrode and the transparent electrode are laminated with the insulating film interposed therebetween, and
the pixel electrode is provided with a linear slit in an inside thereof.

4. The liquid crystal display panel according to claim 1, wherein the pixel electrode and the transparent electrode are laminated with the insulating film interposed therebetween, and
the counter substrate includes a common electrode that overlaps the pixel electrode.

* * * * *